United States Patent [19]

Zoludow

[11] Patent Number: 4,725,700

[45] Date of Patent: Feb. 16, 1988

[54] AIRFLOW SWITCH FOR AIR DUCTS

[75] Inventor: Richard S. Zoludow, South Bend, Ind.

[73] Assignee: Dwyer Instruments, Inc., Michigan City, Ind.

[21] Appl. No.: 67,127

[22] Filed: Jun. 29, 1987

[51] Int. Cl.⁴ .............................................. H01C 35/40
[52] U.S. Cl. ............................ 200/81.9 R; 200/302.1; 73/861.76; 340/610
[58] Field of Search ............................ 74/18.1; 307/118; 92/5 R, 99, 100; 73/861.74, 861.75, 861.76; 340/610 X; 200/83 B, 83 R, 83 S, 83 T, 81.9 R, 81.9 M, 286, 290, 302

[56] References Cited

U.S. PATENT DOCUMENTS

| | | | |
|---|---|---|---|
| 3,091,758 | 5/1963 | Lewis | 340/610 |
| 3,566,060 | 2/1971 | Phillips et al. | 200/83 |
| 3,845,259 | 10/1974 | Spurr | 73/861.76 |
| 4,074,097 | 2/1978 | Hutchinson | 73/861.76 |
| 4,454,768 | 6/1984 | Nansel | 73/861.76 |

Primary Examiner—G. P. Tolin
Attorney, Agent, or Firm—Mann, McWilliams, Zummer & Sweeney

[57] ABSTRACT

An airflow switch for sensing airflow or lack of same in an air duct comprising a housing base, mounting in side-by-side relation an adjustable range spring and a single-pole double-throw snap action microswitch, with the microswitch having its actuating lever operated by a bellcrank type input lever against an adjustable spring bias applied thereto by the range spring, with the housing base having an open center across which is secured a metallic disc that forms with the base an essentially isolated chamber in which the input lever is disposed, with sealing gasketing being applied to and about the disc rim, and with the disc being formed adjacent the mid portion thereof with a cross aperture through which the shank of a vane assembly extends for securement to the bellcrank input lever for operation of the vane assembly against the range spring bias; the vane assembly includes a vane adapted to be disposed well within the duct, and the vane assembly shank is dust sealed thereabout adjacent the disc through aperture by flexible sealing fingers that dust seal the chamber, in which the bellcrank operates, from dust in the duct airflow.

6 Claims, 12 Drawing Figures

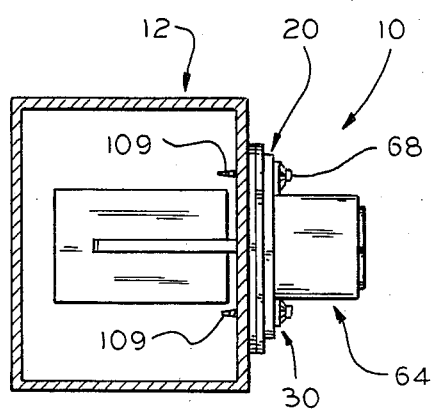
FIG.IA
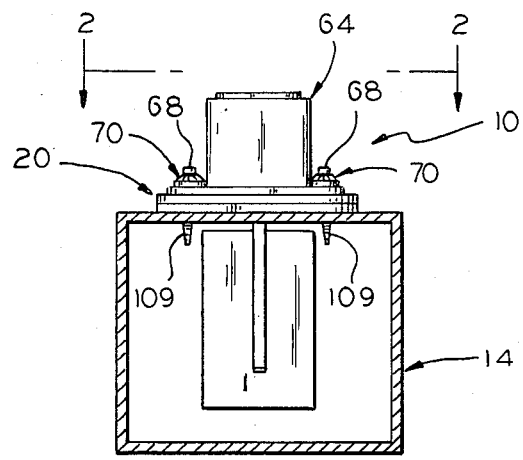
FIG.IB
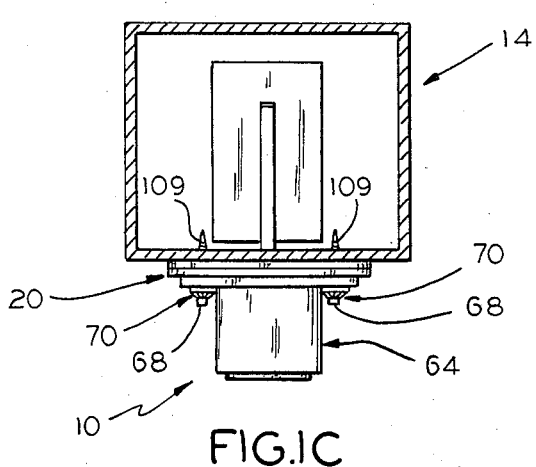
FIG.IC
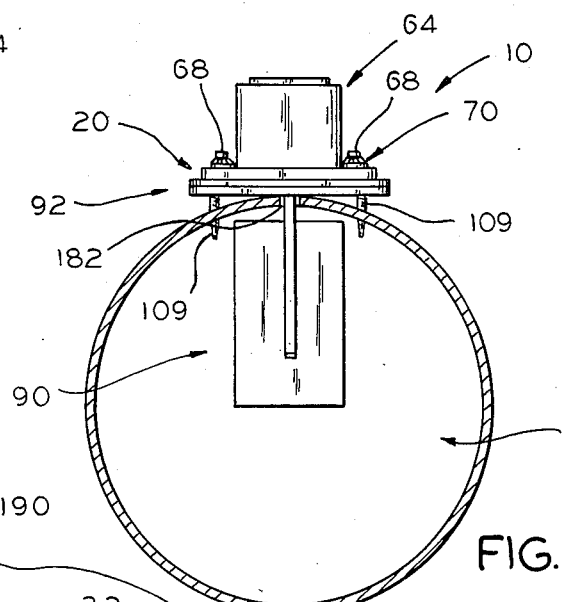
FIG.ID
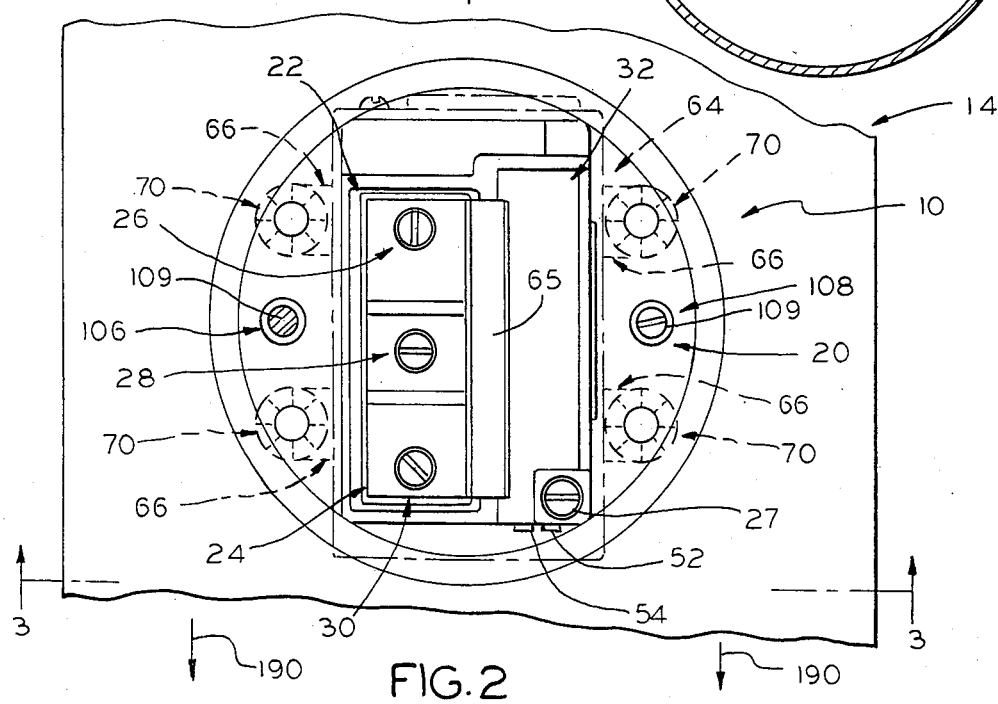
FIG.2

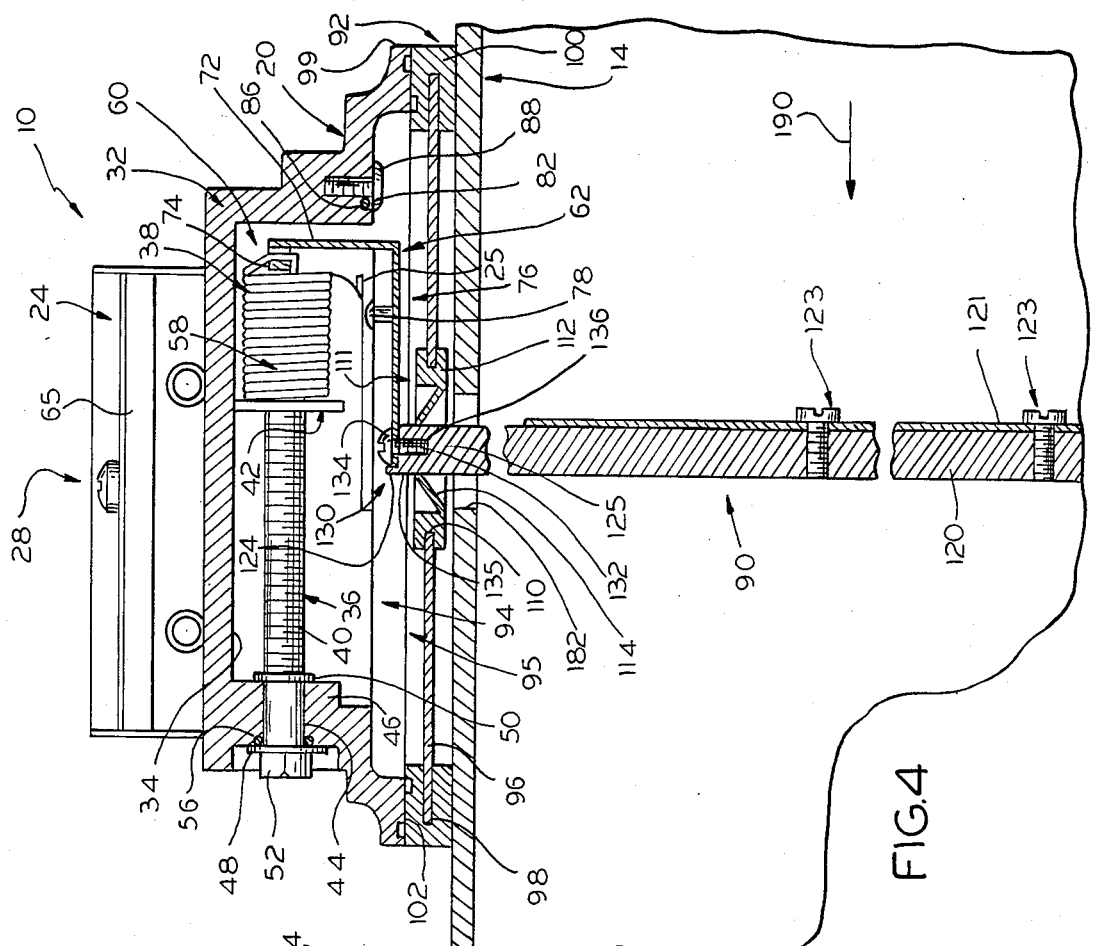
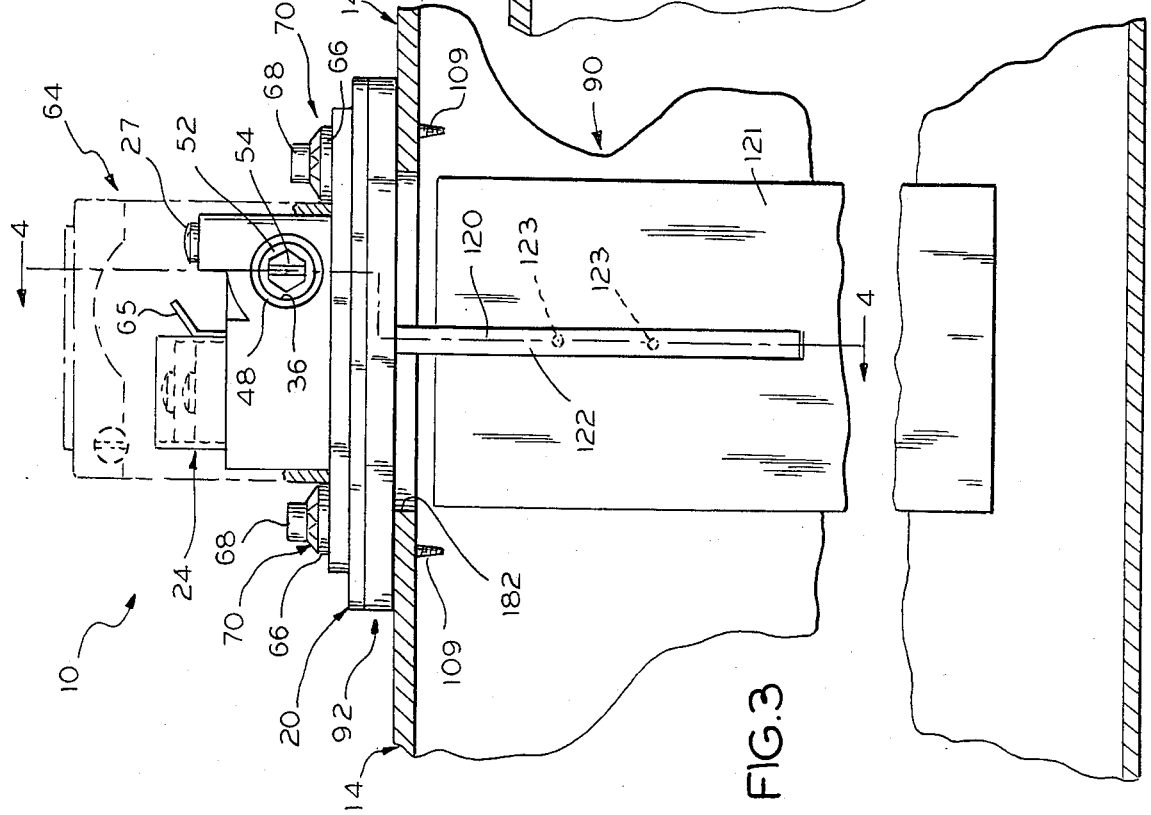
FIG.3
FIG.4

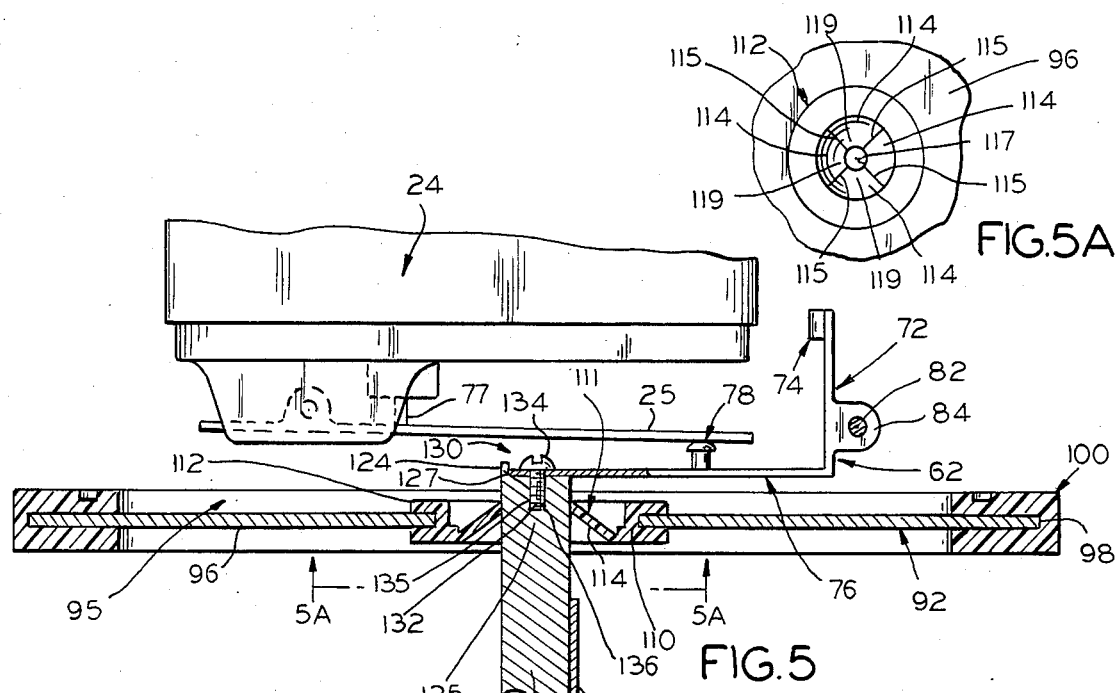
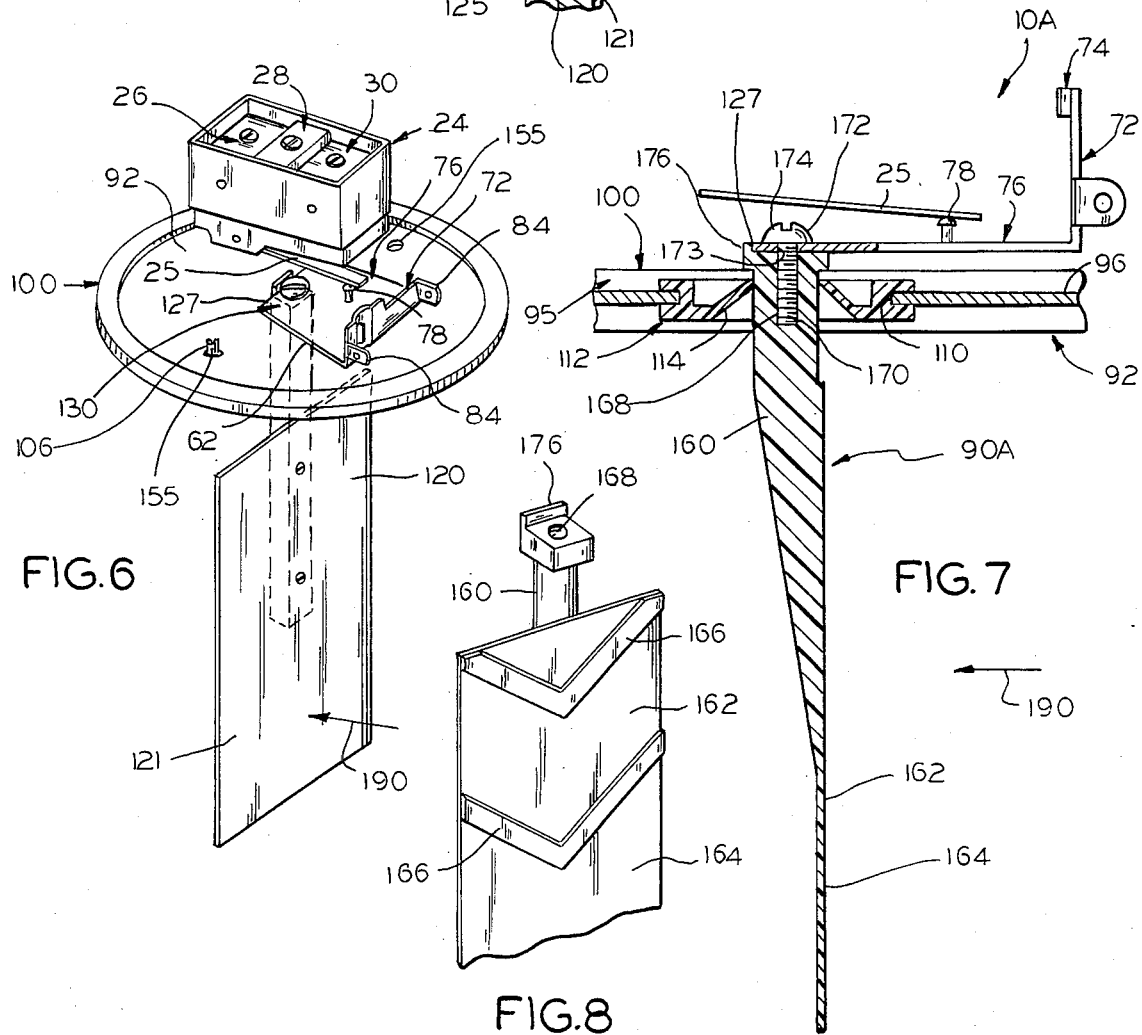

AIRFLOW SWITCH FOR AIR DUCTS

This invention relates to an airflow switch for application to air ducts for sensing airflow or lack of same within the duct, and more particularly, to an airflow switch that can be mounted on the exterior of a horizontal or vertical air duct and includes a vane assembly that is to extend well into the interior of the duct for operating an electric switch through an adjustable range spring biased input lever for detecting, for instance, airflow at or above a given setting, or detecting a zero airflow or reduction in airflow below a given setting.

Airflow switches as applied to air ducts are commonly used to actuate a blower and/or an alarm or other signal in the event that the airflow rate within the duct drops below a predetermined amount, to shut off a blower and/or an alarm or other signal when the airflow exceeds a predetermined amount, or the like. Airflow switches are commonly employed in, for instance, building air distribution systems of the air heating or air conditioning types, to detect a change or loss of airflow velocity that might be caused by a closed damper or fan inlet, a loose fan wheel, a slipped or broken fan belt, a dirty or clogged air filter, or an overload of a fan switch.

The present invention is directed to employing the low profile housing base with its bellcrank type adjustable range spring opposed input lever actuated microswitch of Phillips and Zoludow U.S. Pat. No. 3,566,060 (assigned to the same assignee of the present application) to sense airflow, or the lack of same, in an air duct, with the input lever being actuated by a vane assembly that is to project from the housing base into the interior of the duct.

A principal object of the present invention is to provide an airflow switch arrangement that operates equally well in connection with either horizontal or vertical air ducts, that may be readily applied to any side of a vertical duct, or to the side, top or bottom of a horizontal duct, and that may be applied to ducts of either quadrilateral or round transverse cross-sectional configuration.

Another principal object of the present invention is to provide an airflow switch that senses airflow velocity or the lack of same within an air duct, for the purpose of electrically controlling, for instance, a blower which induces the airflow through the duct, actuates an alarm when the airflow through the duct is inadequate, shuts off the alarm when the airflow through the duct is greater than adequate, etc.

Yet another principal object of the invention is to provide a field adjustable low profile airflow switch that may be mounted on the exterior surfacing of the duct, for use as an air duct airflow sensing device, in which the switch actuator is a vane assembly that is secured to a switch input lever to operate against an opposing adjustable range spring force to close or open the device switch, in accordance with the control function desired, with the vane of the vane assembly operating within the duct.

In accordance with the present invention an airflow switch for application to the exterior of air ducts, for sensing the airflow or lack of same within the duct is provided, which airflow switch includes the low profile housing base of said U.S. Pat. No. 3,566,060 that mounts in side-by-side relation the controlling microswitch and adjustable range spring therefor that applies an adjustable bias to a bellcrank type of input lever which acts against the switch actuating lever (wherein the bellcrank has one of its arms connected to the adjustable range spring and the other of its arms operating the switch actuating lever), with the housing base defining an open centered under portion in which the input lever is disposed, and the housing base being secured to a metallic disc that forms with the housing base an essentially isolated, dust sealed, chamber in which the input lever operates. The airflow switch includes a vane assembly that has a vane shank which extends through a centrally located aperture in the disc for fixed connection to the bellcrank other arm, wih the vane assembly also including a vane that extends from the vane shank and is oriented for crossflow positioning within the air duct relative to the direction of flow of air through the duct, with the disc including sealing gasketing about its rim and a dust seal at its aperture through which the vane assembly shank extends for dust sealing off the input lever chamber from dust that may be in one or both the ambient air and the airflow through the duct.

Other objects, uses, and advantages will be obvious or become apparent from a consideration of the following detailed description and the application drawings, in which like reference numerals indicate like parts throughout the several views.

In the drawings:

FIGS. 1A–1D are small scale, largely diagrammatic, views, illustrating an airflow switch arranged in accordance with the present invention mounted in several different locations on the exterior of differet types of air ducting in common use, with the device sensing vane disposed within the duct, and in transverse section through the air ducting, in each case, being on the downstream side of the switch;

FIG. 2 is a top plan view of the airflow switch as shown in FIG. 1B as viewed along line 2—2, with the conduit cover for the housing base that is block diagram illustrated in FIG. 1B being conventional and being shown in phantom in FIG. 2;

FIG. 3 is an enlarged end elevational view of the airflow switch, as viewed from line 3—3 of FIG. 2, with the switch vane and dust seal shown broken away to permit illustration of the airflow switch on a relatively large scale;

FIG. 4 is a cross-sectional view through the airflow switch of FIGS. 1A–3, taken substantially along line 4—4 of FIG. 3, with the direction of airflow in the duct being indicated by the arrow;

FIG. 5 is an enlarged diagrammatic view, partially in section, of portions of the airflow switch shown in FIG. 4, illustrating the airflow switch metallic disc and the sealing rim and central aperture dust sealing arrangement therefor, including the manner in which the vane shank of the vane assembly is anchored to the switch input lever;

FIG. 5A is a fragmental bottom plan view of the sealing disc central portion dust seal taken substantially along line 5A—5A of FIG. 5;

FIG. 6 is a diagrammatic perspective view of important component parts of the airflow switch, illustrating the vane assembly of the airflow switch of FIGS. 1A–5 as operably connected to the airflow switch assembly input lever that operates the microswitch unit involved;

FIG. 7 is a fragmental view similar to that of FIG. 5 illustrating a modified embodiment of the invention; and, FIG. 8 is a diagrammatic perspective view showing the modified vane assembly of FIG. 7 including the vane assembly shank and adjacent portion of the vane that are integrally connected in one piece relation.

However, it is to be distinctly understood that the specific drawing illustrations provided are supplied primarily to comply with the requirements of the Patent Laws, and that the invention is susceptible of other embodiments or modifications that will be readily apparent to those skilled in the art, and which are intended to be covered by the appended claims.

Reference numeral 10 of FIGS. 1A–1D generally indicates one embodiment of the invention airflow swich assembly applied to the exterior of air ducting of several types and configurations, as viewed from the downstream side of same. In the showing of FIG. 1A, the airflow switch assembly 10 is applied to one side of a vertical air duct 12; in accordance with the present invention the airflow switch assembly 10 could be applied to any one of the other three sides of the rectangular vertically disposed air duct 12.

In the showing of FIG. 1B the airflow switch assembly 10 is shown applied to the top of a horizontal air duct 14, while in the showing of FIG. 1C, the airflow switch assembly 10 is shown applied to the underside of horizontal duct 14.

In the showing of FIG. 1D, the airflow switch assembly 10 is shown applied to a top of an air duct 16 of circular transverse cross-sectional relation, and in a manner that will be made clear hereinafter.

The air ducts 12, 14, and 16, are intended to represent diagrammatically the various types and configurations of airflow ducting that are commonly associated with air heating and air conditioning systems, or the like, where, for instance, a blower is to be activated when airflow through the duct is zero or falls below a predetermined flow rate, and the blower is to be deactivated when the airflow through the duct is above a predetermined flow rate. As is well known in the art, alarms and other signals are electrically controlled in a similar manner, it being a principal objective of the present invention to provide a sensing instrument that is mounted exteriorily of the ducting involved and yet senses the airflow or lack of same within the air duct in question, with the instrument in question being provided with a vane assembly control switch actuation arrangement intended for use within the duct wherever airflow detection and/or airflow control is desired or required, as for any or all of the purposes itemized hereinbefore.

The airflow switch assembly 10 provided by the invention comprises a low profile housing base 20, similar to the housing base of said U.S. Pat. No. 3,566,060 (the disclosure of which is hereby incorporated herein by this reference). Housing base 20 is formed to define a quadrilaterally configured through opening 22 (see FIG. 2) in which is mounted a familiar form of microswitch 24, such as the microswitch made and sold by Micro Switch Division of Honeywell, Freeport, Ill. As shown in FIGS. 2, 5 and 6, the microswitch 24 includes the usual actuating or "off-on" arm 25, and three terminals 26, 28, and 30, in order to enable the switch 24 to be electrically connected, using the usual electrical conduiting (not shown), so as to be, where desired, normally in open position or normally in closed position, at the installer's option. The housing base 20 also includes, in addition to the conventional ground screw 27 and mounting therefor, a wall structure 32 defining a recess 24 (see FIG. 4) in which is journalled, in side-by-side relation to the swich 24, an adjusting screw 36 and adjustable range spring 38.

As disclosed in said patent, the adjusting screw 36 defines a threaded shank 40 (see FIG. 4) on which a nut 42 is threaded that is of square marginal configuration for being moved longitudinally of the recess 34 without rotating when the adjusting screw 36 is turned. The adjusting screw 36 includes a shank portion 44 that is journalled in the housing base wall 46 between flanges 48 and 50 of the shank 36, to provide, when screw 36 is turned, the indicated rotational movement that adjusts the position of nut 42 along the length of the shank 36. The adjustable screw 36 has a head 52 formed with the usual screw driver blade receiving slot 54 for rotating the adjusting screw so as to adjust the range spring 38. The screw flange 48 is sealed by suitable O ring seal 56 to prevent fluid leakage into recess 34.

The range spring 38 is a conventional helical coil spring fastened at one end 58 of same to the nut 42; a convenient way of doing this is to provide the adjusting nut 42 with helical grooving s into which the indicated spring end 58 is turned to secure the range spring 38 to the nut 42. The other end 60 of the range spring 38 is suitably affixed to input lever 62 that operates the switch 24.

As indicated in full lines in FIGS. 1A–1D, and in phantom in FIGS. 2 and 3, the housing base is normally provided with a suitable cover 64 provided with four identical aperture flanges 66 that are each apertured to, respectively, be received over upstanding studs 68 (see FIG. 3) of the housing base 20, to each of which a suitable type of conventional push on nut 70 may be applied, to secure the conduit cover 64 in place, after the wiring has been completed.

In this connection, the microswitch 24 is provided conventionally with a slide mounted flange 65 that forms no part of the present invention.

As disclosed in said patent, the input lever 62 is of bellcrank configuration (see FIGS. 4, 5 and 6) defining a short arm 72 that is equipped with a suitable tab 74 to which the end 60 of the range spring 38 is suitably anchored; the input lever 62 also defines a long arm 76 provided with a suitable spherically contoured contact head 78 that engages the arm 25 of the switch 24. Input lever 62 is pivotally mounted on the inside of the housing base 20 by pivot rod 82 (see FIG. 4) passing through the input lever eyelets 84 (see FIG. 6) that are formed on either side of the input lever short arm 72 with the rod 82 being seated in a groove 86 formed in the base and held in place by several screws 88 threadedly received in the base 20, all as disclosed in said Phillips and Zoludow U.S. Pat. No. 3,566,060. The range spring 38 acts in tension to bias input lever 62, in opposition to the bias that conventionally acts on switch arm 25 (by the nature of the conventional arrangement of switches 24) through the switch plunger 77 (see FIG. 5) to tend to swing arm 25 clockwise of FIG. 5, so that the spherically contoured protuberance 78 is always in contact with the arm 25 of switch 24, but the bias involved is insufficient to shift switch arm 25 as needed to "turn the switch 24 off or on".

In accordance with the present invention, operably associated with the housing base 20 and its associated parts illustrated by the drawings is a vane assembly 90 and a housing base sealing cover assembly 92 that closes off the otherwise open center 94 of the housing base 20 to form an essentially isolated chamber 95 in which the input lever 62 is disposed, and into which the vane assembly 90 extends for fixed connection to the long arm 76 of input lever 62, as indicated in FIGS. 4 and 5.

In all of the illustrated embodiments of of the invention, the cover assembly 92 comprises metallic disc member 96 defining a circular rim portion 98 having a diameter approximating the rim portion 99 of the housing base 20, to which rim portion 98 is applied annular gasket 100 that is formed from a suitable fluid sealing material, such as silicon rubber or the like, and which is to seat firmly against the annular undersurfacing 102 of the housing base 20 in sealing relation thereto. For this purpose, the disc member 96 and the housing base 20 are joined together by eyelet-type tubular rivets 106 and 108 (see FIG. 2) that are to respectively receive therethrough suitable self tapping screws 109, in securing the airflow switch assembly 10 to a duct, as described hereinafter.

The disc member 96 at its axial center is formed with an aperture 110 in which is mounted dust seal 111 comprising annular gasket 112 that may be formed from the same sealing material as gasket 100, but which also includes a plurality of relatively thin, flexible, and integral sealing fingers 114 (four in the illustrated embodiment) for purposes of sealing off the chmber 95 against dust in the airflow within the duct, and about the vane assembly 90. Fingers 114 are shaped and biased toward chamber 95 to come together at their side edges 115 and define a circular aperture 117 at their tips 119 (see FIG. 5A).

In the embodiment of FIGS. 2-6 the vane assembly 90 comprises a vane metallic shank or stem 120 (formed from brass or the like) that is of square transverse section rod-like configuration, and has vane 121 secured thereto against one of the planar faces 122 thereof, by suitable screws 123 that pass through vane 121 into threaded engagement with the vane shank 120. Vane 121 comprises a length of sheet metal of appropriate width and length dimensioning (depending on the transverse cross-sectional dimensioning of the duct to which assembly 10 is to be applied) that is of film thickness proportions for lightness in weight (stainless steel is preferred), with the vane shank 120 at its end 125 being formed to define an upstanding flange 124 against which the rectilinear end 127 of the input lever arm 76 engages, in the assembled relation of the device, to fix vane shank 120 so that it does not rotate about its longitudinal axis (relative to base 20 and input lever 62).

The vane shank 120, in accordance with the invention, extends upwardly through the cover assembly 92, and specifically through the dust seal gasketing fingers 114, to receive a suitable screw 130; screw 130 comprises threaded shank 132 and head 134, with the long arm 76 of the input lever 62 being suitably apertured as at 135, and the shank 120 being formed with a suitable threaded bore 136, for firmly fixing the input lever arm 76 between the screw head 134 and the vane shank 114, with the end 127 of the input lever arm 76 seated against the vane shank flange 124. As indicated in FIG. 6, screw 130 is located sufficiently to one side of the switch actuating arm 25 (longitudinally of pivot rod 82) so that the screw head 134 will not engage arm 25.

In this connection, and as already brought out, the dust seal gasket 112, and specifically its fingers 114, are biased to fit together in interfitting relation, as indicated in FIG. 5A, when the vane assembly 90 is free of the cover assembly 92, and define an aperture 117 that is of less diameter than the external perimeter of the vane shank 120. Thus, when the vane shank 120 is to be applied to an input lever 62 that has been mounted in a housing base 20 as indicated, the end portion 125 thereof to which the screw 130 is to be applied, is pushed into the chamber 95 centrally of the dust seal fingers 114 to dispose them in dust sealing relation thereagainst, as indicated in FIGS. 4 and 5.

When the airflow switch assembly 10 is assembled, airflow impinging against the vane assembly 90 from the right hand side of FIGS. 4-6, swings input lever 62 clockwise about the pivot axis defined by pivot rod 82 to shift the switch actuating arm 25 accordingly (counterclockwise of FIGS. 4 and 5); when airflow drops off or is non-existant from the same direction, the opposite movement of arm 25 occurs, the range spring 38 insuring that spherical contact head 78 remains in contact with switch arm 25. The switch 24 may be "turned off or on" by either motion of the input lever 62, depending on the electrical function to be served (as has been previously indicated).

The disc 96 is suitably apertured; as at 155 (see FIG. 6) to receive the respective eyelet type rivets 106 and 108.

In the embodiment 10A of FIGS. 7 and 8, the housing base 20, the switch 24, the input lever 62, and the cover assembly 92 are the same as in the embodiment of FIGS. 2-6. The vane assembly 90A of this embodiment 10A is of all plastic one piece construction, formed from a suitable plastic, such as nylon. The vane assembly 90A comprises vane shank or stem 160 that merges into and is integrally connected to vane 162, which, preferably on the side 164 of same that is to have the airflow impinge against it, is suitably ribbed or strength purposes, as indicated at 166. The shank 160 at its upper end is formed with suitable internal threaded opening 168 that receives the threaded shank 170 of suitable securement screw 172, which screw shank also passes through aperture 173 of input lever arm 76; the head 174 of screw is thus to be turned firmly against the long arm 76 of the input levr 62. The vane shank 160 is also formed to define upstanding flange 176 against which the end edging 127 of the input lever long arm 76 is to seat to fix the vane assembly 90A against rotation relative to the input lever 62, as in the case of the switch 10. As shown in FIG. 7, vane assembly 90A is applied to chamber 95 in the same manner as vane assembly 90 when screw 172 is in place against the input lever arm 76.

In the embodiment of FIGS. 2-6, the vane assembly 90 may be formed from brass, stainless steel, and/or aluminum.

In use, where it has been determined that airflow switch assembly 10 or 10A should be located along a particular duct of rectangular transverse section, the duct is appropriately transversely slotted as at 182 (see FIG. 3) to receive the vane assembly employed, as indicated in FIGS. 3 and 4. After the vane assembly has been inserted within the duct, the airflow switch base 20 is seated against the duct, and the suitable self tapping screws 109 turned into the underlying duct side wall, through the respective tubular rivets 106 and 108, to fix the airflow switch in mounted relation, with the vane assembly thereof disposed within the duct.

For round ducting, the switch assemblies 10 and 10A are applied thereto in the same manner, though longer self tapping screws 109 may be required to span the gap between the tubular rivets 106 and 108 and the duct side wall through which screws 109 are to be respectively turned, as indicated in FIG. 1D.

In this connection, the airflow switch assemblies 10 or 10A should be mounted on the ducting involved so that the airflow, when it exists in the ducting, acts to swing the vane assembly involved in the manner indicated in FIGS. 4-6 (so that the long arm 76 of input lever 62 will tend to swing away from the unit cover assembly 92 when the airflow is at a sufficient flow rate, depending on the setting of range spring 38 that is made for a particular installation).

The airflow switch assemblies 10 and 10A, when electrically wired to suit the installer's purpose, can be employed to detect an airflow at or above a predetermined range spring setting, or detect a no airflow or reduction of airflow below a predetermined range spring setting, as desired. This is accomplished by physically sensing the airflow velocity. The switch configuration employed will determine whether the switch is designed for low, medium, or higher airflow velocities. As already mentioned, it is preferable that the switch 24 be a single-pole, double-throw snap action switch, of which the well known microswitch is an example, which switch 24 can make or break a circuit on the presence or absence of airflow, as sensed by the switch vane assembly. The airflow switch assemblies 10 and 10A accommodate variant air duct cross sectional dimensions by varying the vane length, with six inch or eight inch air ducting being preferred for application of this invention.

As indicated in FIG. 4, assuming airflow in the direction of the arrow 190 has sufficient force acting on the vane 121 or 162 to overcome the opposing range spring force, the snap switch will, for instance, be energized, with the reverse being true as the airflow force acting on the vane drops off. To achieve various flow ranges, a number of range springs capable of different biasing actions may be employed, as is conventional. The airflow assemblies of the present invention are fully adjustable utilizing adjustment screw 36. With the conduit cover 64 removed, the wiring to the switch is conveniently effected or made accessible.

The airflow velocities with which the airflow switch assemblies of the present invention are operable range from approximately 200 feet per minute to approximately 2,500 feet per minute. The invention is preferably used in connection with six inch or larger air ducts to, for instance, actuate a signal when an airflow starts (or stops), actuate or deactuate a blower motor when an airflow rate changes, or to operate an alarm when an airflow starts (or stops).

Horizontal duct mounting is recommended, but vertical duct mounting can be employed with the invention airflow which assembly, as hereindisclosed.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. An airflow switch for application to air ducts and including a housing base arranged for fixed securement to a duct and fixedly mounting an electric switch and pivotally mounting a bellcrank type input lever having one of its arms connected to an adjustable range spring and the other of its arms operating the switch, the improvement wherein:

the housing base has secured to same over the input lever a metallic disc forming with the base an isolated chamber in which the input lever is disposed, said metallic disc having a circumambient rim and a cross aperture spaced from said disc rim, a vane assembly including a vane shank extending through said disc aperture, said shank connected to the input lever other arm and a vane depending from said vane shank and oriented for cross flow positioning in the air duct relative to the direction of flow of air through the duct, means fixing said vane assembly to the input lever other arm in said cross flow positioning orientation, and means sealing said chamber about said disc rim and at said disc aperture about said vane shank.

2. The improvement set forth in claim 1 wherein:

said means fixing said vane assembly to the input lever other arm comprises screw means making said vane shank fast to the input lever other arm.

3. The improvement set forth in claim 2 wherein:

said vane is a length of metallic sheeting fixed to said shank, and said screw means comprises a single screw having a head, with the input lever other arm being clamped between said screw head and said vane shank, said vane assembly defining a flange cooperating with the input lever other arm to maintain said vane assembly in said cross flow positioning orientation with respect to the housing base.

4. The improvement set forth in claim 1 wherein:

said vane and said vane shank are of integral one piece construction, said vane assembly defining a flange cooperating with the input lever other arm to dispose said vane assembly in said cross flow positioning orientation relative to the housing base.

5. The improvement set forth in claim 1 wherein:

said sealing means at said disc aperture defines a plurality of radial flexible fingers about said disc aperture through which said vane shank centrally extends.

6. The improvement set forth in claim 1 wherein:

said disc is of curvilinear marginal configuration, with said disc aperture being located centrally of same.

* * * * *